United States Statutory Invention Registration [19]

[11] Reg. Number: H112

Donovan et al. [45] Published: Aug. 5, 1986

[54] PROJECTILE STABILIZER

[75] Inventors: William F. Donovan, Aberdeen; Michael Nusca, Baltimore, both of Md.

[73] Assignee: The United States of America as represented by the Secretary of the Army, Washington, D.C.

[21] Appl. No.: 820,482

[22] Filed: Jan. 3, 1986

Related U.S. Application Data

[63] Continuation of Ser. No. 595,099, Mar. 30, 1984.

[51] Int. Cl.[4] ..... F42B 13/00; F42B 13/24; F42B 15/00

[52] U.S. Cl. ..... 102/501; 244/3.3

*Primary Examiner*—Deborah L. Kyle
*Assistant Examiner*—Ted L. Parr
*Attorney, Agent, or Firm*—Anthony T. Lane; Harold H. Card, Jr.; Michael C. Sachs

[57] ABSTRACT

A projectile comprises a nose ogive tapering outwardly to a cylindrical or conical body portion of caliber diameter. A reversely tapering stabilizer is connected to the rear of the body portion and is terminated at a tail stabilizer which tapers outwardly in the same direction as the nose ogive. The largest diameter of the tail stabilizer is at most equal to and preferably less than the caliber. Aerodynamic stabilization is thus achieved without the use of a sabot or complex stabilizer fin deployment mechanisms.

16 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
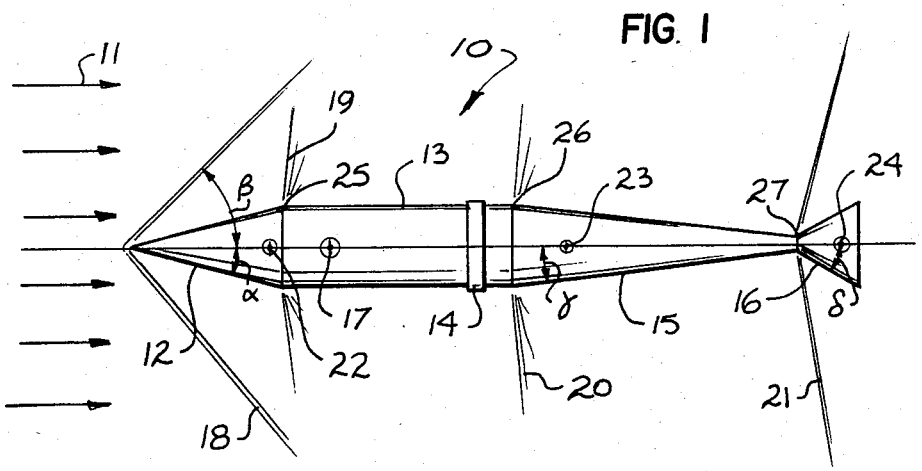
FIG. 2
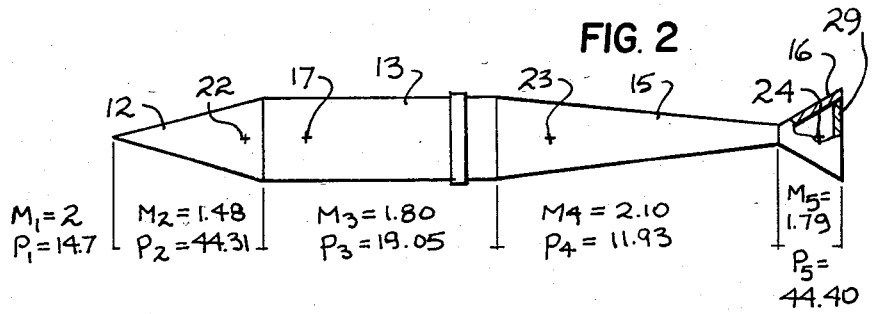
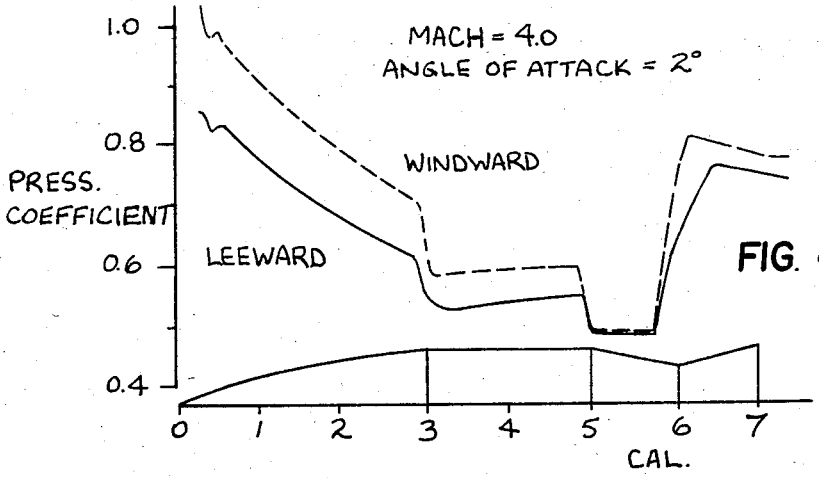
FIG. 4
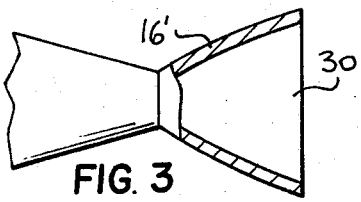
FIG. 3
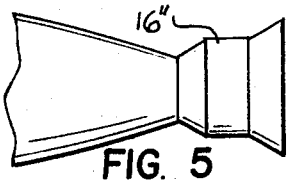
FIG. 5

PROJECTILE STABILIZER

The invention described herein may be manufactured, used and licensed by or for the Government for Governmental purposes without the payment to us of any royalties thereon.

This application is a continuation of Ser. No. 595,099, filed Mar. 30, 1984, now pending.

FIELD AND BACKGROUND OF THE INVENTION

The present invention relates in general to ballistic projectiles, and in particular to a new and useful projectile configuration having a subcaliber rear section which increases aerodynamic stability.

So-called "long rod" projectiles are stabilized by external fins or supercaliber flare skirts, which employ aerodynamic lift at the aft section to "right" the projectile with the trajectory as it oscillates slightly out of axial alignment with the oncoming airstream. This constitutes a static stabilization since the distribution of static pressure over the projectile results in a self-compensating aerodynamic moment acting in the neutralizing sense.

So called "short" projectiles must be spinned at very high rates utilizing rifling of a gun tube to thereby acquire gyroscopic stability which maintains the alignment of the projectile axis. Short projectiles are inherently statically unstable. An upper geometric limit on spin stabilization is reached at a length to diameter ratio of approximately seven. Separately, an upper limit on spin is imposed by the appearance of unfavorable dynamics such as Magnus effect and damping.

Long rod projectiles require sabots to fill the annular void necessarily created by the difference in diameter between the fin span and the projectile. Alternately, a complex mechanical folding and deployment mechanism is utilized for the fin stabilizers.

On the other hand, short projectiles must be designed to operate in the restricted spin range and are further constrained to the available rifle twists.

U.S. Pat. No. 4,195,573 to Leeker et al. discloses a flare stabilized projectile having flow passages through the skirt. A sabot is utilized on the forward part of the projectile body which is equal in outer diameter to the skirt so that only a subcaliber projectile can be accommodated.

U.S. Pat. No. 3,620,167 is also pertinent for showing a tail stabilizer. The main body of the projectile having a maximum caliber size diameter does not however, taper in one direction toward the tail stabilizer with the tail stabilizer tapering outwardly in an opposite direction.

U.S. Pat. No. 3,745,926 to Mertz et al discloses a long-rod projectile with spin stabilization utilizing a boat-tail type rear section which may contribute to decreasing static stability.

U.S. Pat. No. 3,081,703 to Kamp et al discloses an expandable flared control system for stabilizing a projectile.

SUMMARY OF THE INVENTION

An object of the present invention is to provide a projectile which includes a rear section stabilizer no larger in diameter than the projectile caliber, the projectile having a main body portion without sabot which has a caliber sized diameter.

In this way, and particularly for a long rod projectile, the full bore of the gun may be utilized for maximizing payload. Structural impedements found by utilizing fins which are usually thin in cross section and must rotate submerged in a propellant bed, are also avoided, as are thermal problems associated with such thin blade fins which must fly in an exposed high velocity air stream.

When applied to short projectiles, the invention permits an increase in the range of allowable twist which is necessary for stabilization by reducing the lower limit required for gyroscopic stability.

Accordingly, a further object of the invention is to provide a projectile which is simple in design, rugged in construction and economical to manufacture.

The various features of novelty which characterize the invention, are pointed out with particularity in the claims annexed to and forming a part of this disclosure. For a better understanding of the invention, its operating advantages and specific objects attained by its uses, reference is made to the accompanying drawings and description matter in which preferred embodiments of the invention are illustrated.

BRIEF DESCRIPTION OF THE DRAWINGS

In the drawings:

FIG. 1 is a side elevational view of a projectile in accordance with the invention;

FIG. 2 is a view similar to FIG. 1 showing regions of changing pressure and airstream velocity across the length of the projectile;

FIG. 3 is a fragmentary rear sectional view of another embodiment of the stabilizer;

FIG. 4 is a graphic representation showing the pressure coefficient plotted against the length of the projectile in units of caliber; and FIG. 5 is a view similar to FIG. 3 of another embodiment of the invention.

DESCRIPTION OF THE PREFERRED EMBODIMENTS

Referring to FIG. 1 in particular, the invention embodied therein comprises a projectile generally designated 10 which may be of the short or long rod type, which includes a nose ogive 12 which may be conical or in the shape of a power curve in longitudinal section.

The nose ogive 12 tapers outwardly and to the rear of the projectile, to a cylindrical or conical body 13 which is substantially of caliber diameter. Ogive 12 meets body 13 at a junction 25. Body 13 may also carry driving grooves and/or a rotating band 14.

Connected to body 13 at a junction area 26 is a reversed taper stabilizer 15 which also be of conical or power curve shape.

At the rear of projectile 10, and connected to stabilizer 15 at junction 27, is a tail stabilizer 16 which tapers outwardly and in a direction reverse to that of stabilizer 15. Tail stabilizer 16 may also be conical or of power curve shape.

Projectile 10 has a center of gravity at 17 and, as shown in FIG. 2, centers of pressure at 22, 23 and 24 for the ogive, reverse tapered stabilizer and tail stabilizer sections respectively. The points represent the center of effective air pressure against these sections.

In the embodiment of FIG. 1, the nose ogive 12 has a tapering angle of $\alpha$ equal to 14°. The reverse tapered stabilizer 15 has a tapered $\gamma$ of 7° and the tail stabilizer 16 has a taper of $\delta$ of 30°.

An oncoming airstream 11 at supersonic velocity $M_1$ generates a shockwave 18 which extends at an angle $\beta$ of about 44° with respect to the longitudinal axis of the projectile 10. The static pressure in front of shockwave 18, designated $P_1$ is taken to be atmospheric pressure of 14.1 lbs/in$^2$. The remaining thermodynamic properties of the medium assume values according to the Keenan and Kaye Air Tables. For simplicity, all processes are adiabatic though not necessarily isentropic.

The shockwave angle $\beta$ of 44° is determined assuming an inviscid flow at a Mach number of 2.0 to approach a supersonic airstream of $M_1=2$ traversing the shockwave 18. This is on a basis of the nose ogive angle of 14°.

Referring now to FIGS. 1 and 2, the speed property after the nose 12 is obtained according to $M_x=M_1 \sin \beta=1.39$ whereby $M_2=1.48$ from the published tables in Kuethe and Schetzer. A Prandtl-Meyer expansion 19 occurs at the nose-cylinder junction 25 over which the velocity changes to $M_3=1.80$ from a curve of Shapiro, for the assumed nose half angle of 14°. Expansion also takes place at 20 around the aft cylinder-cone junction 26, taken as 7°, which produces an increase in Mach number to $M_4=2.1$. Traversing the shock wave 21, from the 30° conical stabilizer skirt 16, results in a final Mach number of $M_5=1.79$. For these shocks, the corresponding pressures, can be determined from Shapiro, which presents properties from equivalent normal shock geometry. The expansion pressures are isentropically related and the pressure ratios across the expansion areas can be determined.

In operation, the net "righting" moment is taken as the algebraic sum of the integrated forward normal force acting at the forward center 22, times the moment arm to the center of gravity 17, as opposed by the integrated aft normal forces acting at aft centers 23 and 24 times the moment arms to the center of gravity 17. With the net aft moment numerically greater than the forward moment, the projectile is statically stable.

It may be argued that the presence of a rotating band on the aft section of the cylindrical body will also be of concern. However, the well known aerodynamic shock off the rotating band in this supersonic flow will serve to increase the downwind pressure (aft of center 17) and further enhance the static stability.

For the instant case of FIGS. 1 and 2, the forward center of pressure 22 is usually found (depending on proportion) to be in the vicinity of the ogive-cylinder junction 25. The aft centers of pressure 23 and 24, from known analysis of simple conical surfaces, will lie approximately at $\frac{2}{3}$ of the altitude taken from the apex and for the reversing conical stabilizer configuration, will be found from the sum of the two separate moment resolutions. It is necessary only to determine the combination of required area and magnitude of pressure to assure static stability.

With the illustrative example shown as FIG. 2 and assuming self cancellation of the cylindrical pressures, the following can be determined:

TABLE

| | Area cal$^2$ | Pressure lbs/in$^2$ | Force lbs-cal$^2$ in$^2$ | Lever cal | Moment lbs-cal$^3$ in$^2$ |
|---|---|---|---|---|---|
| Nose | 2.0 | 44.31 | 88.62 | 1.0 | 88.62 clockwise |
| Aft Cones | | | | | |
| #1 | 1.89 | 11.93 | 22.59 | 4.0 | 90.36 counter-clockwise |
| #2 | .40 | 44.40 | 17.89 | 6.42 | 114.53 counter- |

TABLE-continued

| | Area cal$^2$ | Pressure lbs/in$^2$ | Force lbs-cal$^2$ in$^2$ | Lever cal | Moment lbs-cal$^3$ in$^2$ |
|---|---|---|---|---|---|
| Net | | | | | clockwise 116.27 counter-clockwise |

A more sophisticated analysis includes the viscous effects of the airstream. The results of this analysis are graphically shown in FIG. 4.

Actual tests have been conducted using a 5.56 millimeter gun. A free flight trajectory of 125 feet worked out to 6,852 caliber range. For a 105 millimeter size, this is equivalent to free flight of 2,361 feet.

The invention utilizes what is here referred to as a "reversed-cone" concept. This is intended to allude to the fact that the forward nose cone or ogive is the geometrical element that provides a destabilizing lift which acts to overturn the projectile about its center of gravity 17, and that this is compensated for by providing a similar geometry aft of the center of gravity. It is the pressure developed at the reversed conical surface at the junction 27 between tail stabilizer 16 and reversed taper stabilizer 15 which actually provides the aft lift. The maximum effect is a result of the shock located at the aft taper-cone junction 27 which is greater than that produced at the junction of the typical cylinder-layer.

The base drag of the projectile varies as the square of the diameter. The reduced caliber tail stabilizer 16 has far less drag therefore. The further fact that a sabot is eliminated produces a large economic advantage as well as increased payload capacity.

As shown in FIG. 2, the tail stabilizer 16 may be hollow and include an end seal 29 for payload space within the tail stabilizer. As shown in FIG. 3, which also illustrates a tail stabilizer having a power curve shape, the tail stabilizer 16' is open at 30 for exposure to the propellent gases in the gun.

FIG. 5 shows a multi-sectioned tail stabilizer 16'' that is also within the scope of the invention.

While specific embodiments of the invention have been shown and described in detail to illustrate the application of the principles of the invention, it will be understood that the invention may be embodied otherwise without departing from such principles.

What is claimed is:

1. A projectile comprising:

a forward nose section;

a main body connected to said nose section at one end of said main body, said main body having a maximum diameter; a reversed taper stabilizer section connected to said main body at an opposite end of said main body, having a rearwardly decreasing diameter; and a tail stabilizer section connected to said reversed taper stabilizer section, having a rearwardly increasing diameter, said tail stabilizer section having a maximum diameter at most equal to said maximum diameter of said main body.

2. A projectile according to claim 1, wherein said forward nose section rearwardly increases in diameter.

3. A projectile according to claim 2, wherein said main body is cylindrical.

4. A projectile according to claim 2, wherein said main body is conical.

5. A projectile according to claim 2, wherein at least one of said nose section and tail stabilizer section change in diameter according to a power curve.

6. A projectile according to claim 1, wherein said tail stabilizer is conical.

7. A projectile according to claim 6, wherein said forward nose section is conical and increases in diameter rearwardly toward said main body.

8. A projectile according to claim 1, wherein said tail stabilizer section has a closed rear end.

9. A projectile according to claim 1, wherein said tail stabilizer section is hollow and has an open rear end.

10. A projectile according to claim 1, wherein said tail stabilizer section includes at least two sections, at least one of which increasing rearwardly in diameter.

11. A projectile according to claim 2, wherein said tail stabilizer section includes at least two sections increasing rearwardly in diameter.

12. A projectile according to claim 1, including a longitudinal axis, said reversed taper stabilizer section decreasing in diameter at an angle with respect to said longitudinal axis which is less than an angle between said increasing diameter of said tail stabilizer section and said longitudinal axis.

13. A projectile according to claim 12, wherein said forward nose section increases in diameter rearwardly toward said main body at an angle with respect to said longitudinal axis which is less than said angle of increasing diameter of said tail stabilizer section.

14. A projectile according to claim 3, wherein a length of said reversed taper stabilizer section along said longitudinal axis is more than a length of said tail stabilizer section along said longitudinal axis.

15. A projectile according to claim 14, wherein a length of said forward nose section along said longitudinal axis is greater than the length of said tail stabilizer section and less than the length of said reversed taper stabilizer section.

16. A projectile according to claim 15, wherein said main body is cylindrical, said maximum diameter thereof being a caliber diameter, said tail stabilizer section having a maximum diameter less than said caliber diameter.

* * * * *